US006161574A

United States Patent [19]

Gerhard et al.

[11] Patent Number: 6,161,574

[45] Date of Patent: Dec. 19, 2000

[54] DEVICE FOR A FUEL SYSTEM OF AN INTERNAL COMBUSTION ENGINE

[75] Inventors: Albert Gerhard, Tamm; Willi Strohl, Beilstein; Jochen Rose, Hemmingen; Erich Eiler, Sersheim, all of Germany

[73] Assignee: Robert Bosch GmbH, Stuttgart, Germany

[21] Appl. No.: 09/117,805

[22] PCT Filed: Nov. 17, 1997

[86] PCT No.: PCT/DE97/02690

§ 371 Date: Aug. 6, 1998

§ 102(e) Date: Aug. 6, 1998

[87] PCT Pub. No.: WO98/25024

PCT Pub. Date: Jun. 11, 1998

[30] Foreign Application Priority Data

Dec. 6, 1996 [DE] Germany .......................... 196 50 783

[51] Int. Cl.[7] .................................................... F16K 31/36

[52] U.S. Cl. ........................................... 137/510; 123/514

[58] Field of Search .................................... 123/514, 509, 123/463, 456; 137/510

[56] References Cited

U.S. PATENT DOCUMENTS

| | | | |
|---|---|---|---|
| 4,664,142 | 5/1987 | Bertsch et al. | 137/510 |
| 5,076,320 | 12/1991 | Robinson | 137/510 |
| 5,609,138 | 3/1997 | Mutschler | 137/510 |
| 5,778,926 | 7/1998 | Tanaka | 123/509 |
| 5,785,080 | 7/1998 | Herbst | 137/510 |
| 6,016,831 | 1/2000 | Bueser et al. | 137/315 |

*Primary Examiner*—Pamela Wilson
*Assistant Examiner*—Ken B. Rinehart
*Attorney, Agent, or Firm*—Ronald E. Greigg; Edwin E. Greigg

[57] ABSTRACT

The invention relates to a device for a fuel system, having a pressure chamber that communicates with a fuel connection and having a diaphragm that is installed at its outer peripheral region in a housing and partitions off the pressure chamber. A preassembled unit can be fastened, with the diaphragm built into the housing, on the basic body and the diaphragm can come to rest on a stop provided on the basic body. The device is intended in particular for regulating a pressure in a fuel system.

14 Claims, 4 Drawing Sheets

21
36
37
40
33
35
59
58
61
63
30
38
43
51
47
55
45
62
44
57
46
82
67
64
66
49
48
23
53
65
24
52
54
56
50
61
59
54
58
49
48
53
47
51
44
65
62
45
40
52
56
80
70
73
57
30

DEVICE FOR A FUEL SYSTEM OF AN INTERNAL COMBUSTION ENGINE

PRIOR ART

The invention is based on a device for a fuel system of an internal combustion engine.

One such device is known from German Patent Disclosure DE 44 02 224 A1. This device has a feed pump, which is disposed in the supply tank and can be introduced through an opening in the supply tank. The opening in the supply container can be closed by means of a closure part on which a pressure regulator is disposed. The pressure regulator has a pressure chamber which has a communication with the pressure side of the feed pump, with the internal combustion engine, and with a relief line. The closure part has a plastic, flangelike basic body that closes the opening. An indentation is formed in the basic body, and a stub embodied integrally with the basic body and forming a communication of the pressure chamber with the relief chamber protrudes into this indentation. To form the pressure chamber, the indentation of the basic body is covered with an elastically deformable diaphragm that cooperates directly with the face end of the stub, as a seat. The diaphragm is urged by a spring toward the stub, and if a predetermined pressure in the pressure chamber is exceeded, the diaphragm releases the stub for communication of the pressure chamber with the relief chamber. The diaphragm is secured to the basic body.

In the known device, the diaphragm is placed in the indentation, the spring is placed on it, and then the diaphragm together with a covering is braced against the basic body. Since in the known device the force of the spring acts on the diaphragm before the diaphragm is firmly fastened in place, it is possible to prevent with certainty that the diaphragm will shift to the side somewhat, thus allowing functional disturbances (such as pressure regulation errors, leaks, and so forth) to occur. If the device is installed in an engine compartment, then leaks can be very dangerous.

In an alternative embodiment of a device of DE 44 02 224 A1, it is provided that the housing receiving the spring has a flange on which free ends, bent outward, are formed. To secure the housing, the flange is disposed relative to a collar of a recess of the basic body, and as a result an outer edge of the diaphragm is fastened in place. The free ends of the flange engage the hook, disposed on the collar, from behind, and as a result the flange retains the housing on the basic body and fastens the diaphragm in place. However, this embodiment has the disadvantage that the hooks of the recess must absorb the fastening force of the spring that acts on the diaphragm, so that the diaphragm will close the stub toward the pressure chamber. The attendant major retention forces cannot be absorbed sufficiently by the hooks, as a result of which a drop in the regulated pressure can ensue. This is true particularly because the basic body that retains the housing comprises relatively soft, easily deformable plastic. Moreover, it is has been found that after a relatively long period in service, material fatigue can occur from swelling of the plastic, and as a result the flange of the retaining element cannot be disposed with adequate initial tension relative to the recess of the basic body and the diaphragm cannot be fixed relative to the recess.

ADVANTAGES OF THE INVENTION

The device according to the invention for a fuel system has the advantage over the prior art that simple, fast mounting, for instance of an easily produced, functionally reliable preassembled unit, on the basic body is possible.

The device also has the advantage that complicated parts to form a pressure regulator, for instance, may be embodied as components of a basic body, thus making for a simple design of the preassembled unit. Thus the stub, together with the stop through which the fuel return extends, can be injection molded together with the basic body as a single plastic part using a single injection mold. This has the advantage that in the production of the basic body, no additional effort and expense are needed to produce the stop. In addition, the design of the preassembled unit assures that during the mounting of this group, kinking of the spring is avoided, and thus a proper position of the diaphragm relative to the housing and to the stop provided on the basic body exists. As a result, shifting of the diaphragm during mounting can be reliably averted, thus precluding functional problems (such as pressure regulation errors, leaks, etc.).

In an advantageous feature of the invention, the preassembled unit can be disposed with initial tension relative to the basic body via the fastener. The fastener may preferably be embodied as a resilient ring, preferably a snap ring, which is disposed after the insertion of the preassembled unit into the basic body. This makes for simple, fast mounting, which moreover enables a structurally simple design for receiving the preassembled unit on the basic body.

Another alternative embodiment of the fastener can be provided by a fastening ring, injected into the basic body, with snap elements that are deflectable during mounting and in the mounted state engage a fastening portion of the housing from behind.

Another advantageous embodiment of the fastener may be in the form of crimping that engages around a fastening portion of the housing of the preassembled unit.

The preassembled unit can advantageously be disposed both on a basic body of a tank flange and on a basic body of a fuel distributor tube. Independently of these examples of its disposition, the preassembled unit may also be disposed, on the fastening principles discussed above, at other suitable positions between the tank and the engine or the injection valves.

Advantageous features and refinements of the invention are disclosed hereinafter.

BRIEF DESCRIPTION OF THE DRAWINGS

A plurality of exemplary embodiments of the invention are shown in the drawing and described in further detail in the ensuing description. Shown on different scales are.

DESCRIPTION OF THE EXEMPLARY EMBODIMENTS

Figure 1:
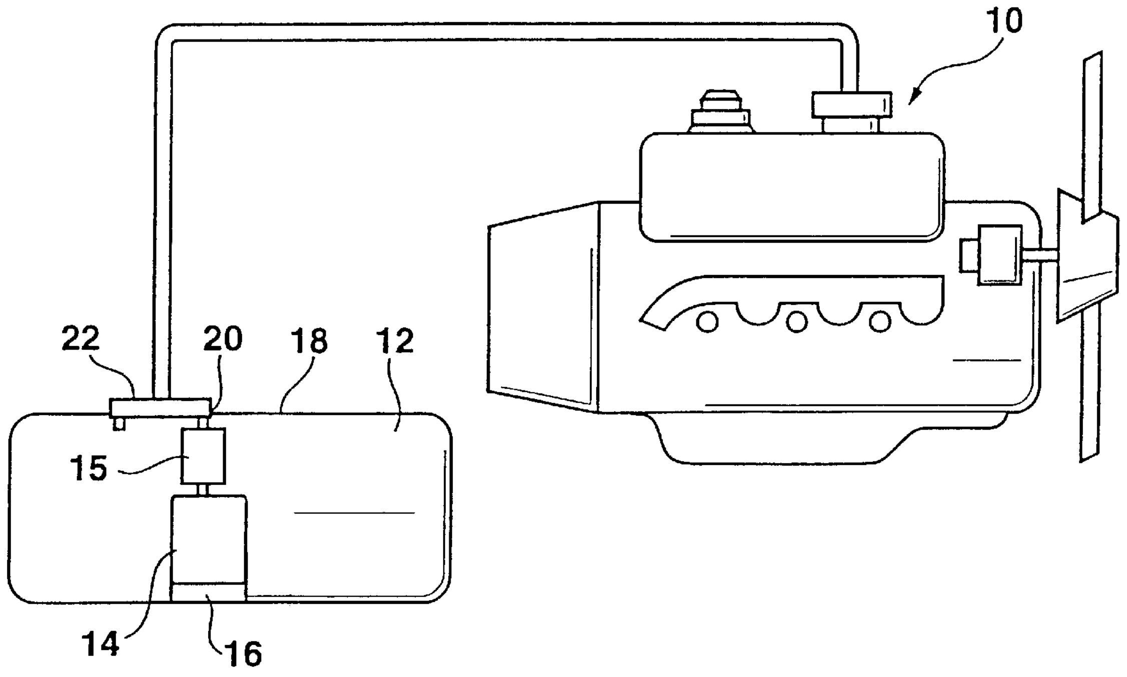
FIG. 1, a device for supplying an internal combustion engine with fuel from a supply container, FIG. 2, a closure part of the supply container of FIG. 1 in a first exemplary embodiment.

A device shown in simplified form in FIG. 1 is used to supply an internal combustion engine 10 with fuel from a supply container 12. It has a feed pump 14, which is disposed in the supply container 12 and retained there in a manner not shown. The feed pump 14 may be embodied arbitrarily and on its intake side aspirates fuel from the reservoir 16 in the supply container 12. The supply container 12, in a wall 18, has an opening 20 through which the feed pump 14 can be introduced. After the introduction of the feed pump 14, the opening 20 is closable with a closure part 22; a line for connecting the pressure side of the feed pump 14 to the engine 10 is extended through the closure part 22. A fuel filter 15 may be disposed in the communication between the pressure side of the feed pump 14 and the closure part 22.

Figure 2:
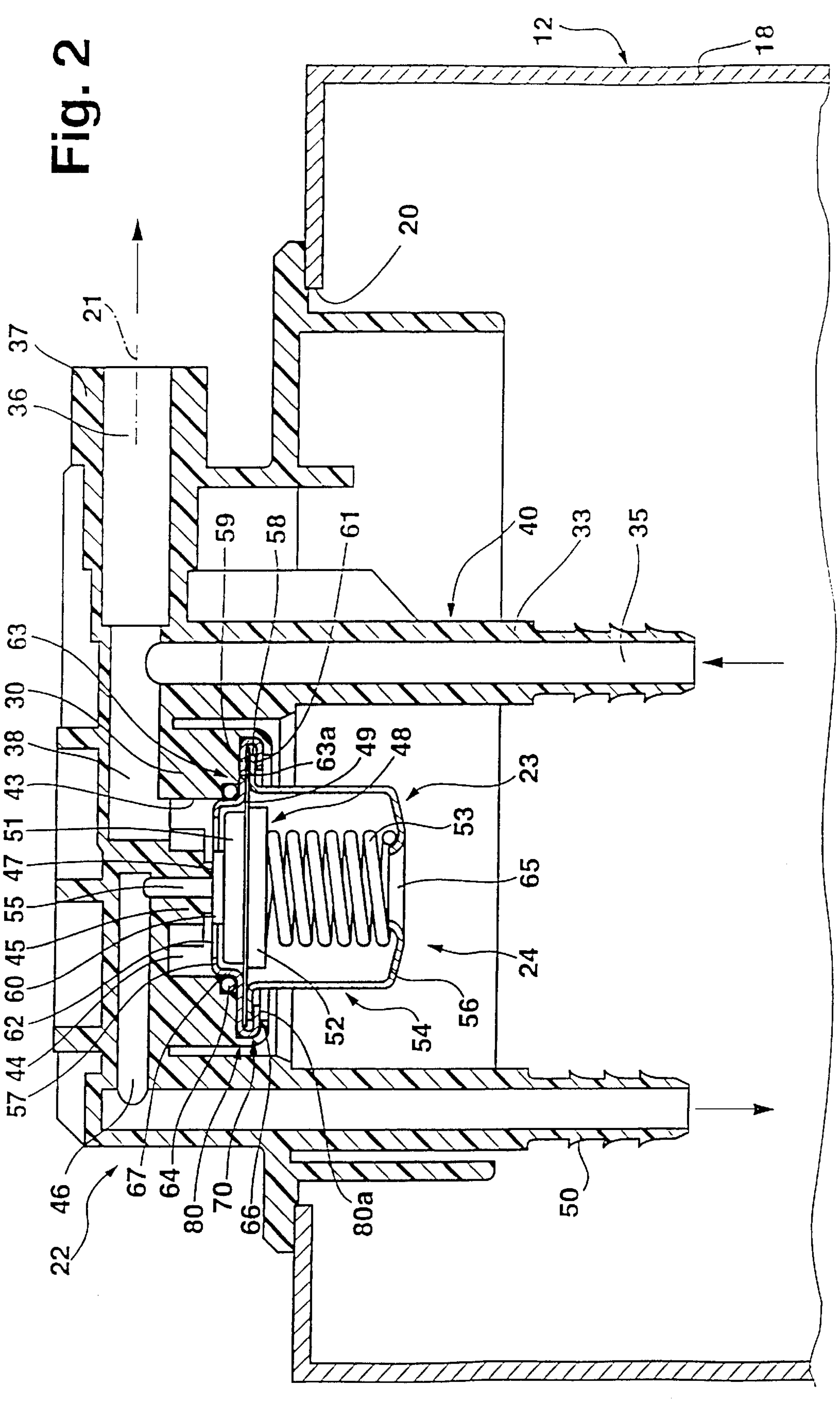

In FIG. 2, the embodiment of the closure part 22 for receiving a preassembled structural group is shown, which in the exemplary embodiment preferably selected for FIG. 2 forms part of a pressure regulator 24. The preassembled structural group will hereinafter be called the preassembled unit 23. The closure part 22 has a flangelike basic body 30, which is produced from plastic by injection molding and covers the opening 20 in the supply container 12. A sealing element may be disposed between an outer edge of the closure part 22 and the wall 18 of the closure part 22. The closure part 22 is secured to the supply container 12 in a manner not shown.

Positional definitions with respect to the closure part 22 will now be given, where a disposition inward means into the supply container 12, and a disposition outward means pointing away from the supply container 12.

An inward-pointing connection stub 33 is formed integrally onto the basic body 30, and a line (not shown) for connection with the pressure side of the feed pump 14 can be connected to the connection stub. Also protruding outward from the basic body 30 is a further connection stub 37, to which a line (not shown) can be connected for connection with the engine 10. The connection stubs 33, 37 communicate with one another through conduits 35 and 36, disposed in the basic body 30; the conduit 35 of the connection stub 33 extends approximately perpendicular to the plane 21. The conduit 36 of the connection stub 37 extends outward, parallel to the plane 21. The connection stubs 33 and 37 may also be disposed in some other, largely arbitrary angular position relative to the plane 21 and to one another.

A transitional region between the conduits 35 and 36 communicates with a conduit 38, which discharges into an indentation 43 of the basic body 30. A stub 45 is disposed centrally to the indentation 43 on the basic body 30 and communicates with a conduit 46, which discharges into an inward-pointing connection stub 50, to which a line can be connected. On its inward-pointing end face, the stub 45 has a stop 47, which in a closing position is closed by a diaphragm unit 48. The diaphragm unit 48 has a diaphragm 49, on whose outward-pointing side a cup 51 is disposed, which rests in the closing position on the stop 47 and tightly closes off the stub 45. On the other side of the diaphragm 49, pointing inward, is a cup 52 on which a spring 53 is supported. A pressure chamber 44 closed off from the diaphragm 49 is formed in the indentation 43.

A return conduit 55 is provided in the stub 45. The return conduit 55 leads from the stop 47, provided on the face end of the stub 45, to the conduit 46. Thus fuel can flow away from the stop 47 through the return conduit 55 and the conduit 46 and through the connection stub 50 into the supply container 12.

A valve body 60 is connected to the diaphragm unit 48. The valve body 60 is retained in an indentation provided in the cup 51. The spring 53 urges the diaphragm unit 48 against the stop 47. If the pressure in the pressure chamber 44 is below a certain value, then the valve body 60 rests on the stop 47. In this state, the course for the fuel out of the pressure chamber 44 into the return conduit 55 is blocked.

If the pressure of the fuel in the pressure chamber 44 is greater than a certain value, then the diaphragm unit 48 is displaced, counter to the contrary force exerted by the spring 53, and the valve body 60 lifts away from the stop 47. In this state, fuel can flow out of the pressure chamber 44 into the return conduit 55.

The spring 53 exerts a contrary force on the diaphragm unit 48. The contrary force can also be engendered in some other way. For instance, a gas chamber may be provided that acts pneumatically on the diaphragm 49 and thus urges the diaphragm unit 48 against the stop 47. The conduits 35 and 38 form a fuel connection 40. The fuel connection 40 extends through the basic body 30. The fuel connection 40 carries the fuel furnished by the feed pump 14, or some of the pumped fuel, into the pressure chamber 44.

The preassembled unit 23 of the pressure regulator 24 has a two-part housing 54, which comprises an upper part and a lower part. The upper part of the housing 54 will be called the first housing part 56 hereinafter, and the lower part will hereinafter be called the second housing part 57. The housing 54 may, in a modification of the preferably selected exemplary embodiment, also comprise three or more than three housing parts, for instance. The first housing part 56 and the second housing part 57 are advantageously made from sheet steel. The first housing part 56 and the second housing part 57 have two conversely oriented portions 58, 59, disposed parallel to one another, on their free ends, and between these portions the diaphragm 49 is fastened in its peripheral region. The portion 59 of the housing part 57 is adjoined by a further portion 61 which engages the portion 58 of the first housing part 56 circumferentially. It is also possible for the peripheral regions of the first housing part 56 and of the second housing part 57 to be press-fitted to one another or in some other way fixed relative to one another, so that the diaphragm 49 is firmly fastened on its outer peripheral region. As a result of this crimping the first housing part 56 is fixed relative to the second housing part 57, so that secure reception of the diaphragm unit 48 or of the diaphragm 49 is provided. The second housing part 57 has an opening 62, which enables communication between the side of the diaphragm unit 48 toward the pressure chamber 44 and the pressure chamber 44 provided in the indentation 43. The crimping over of the housing parts 56, 57 on their respective outer circumference in the region of the portions 58, 59, 61 forms a firm connection 70 between the first housing part 56 and the second housing part 57 of the two-part housing 54. As a result of the firm connection 70, the outer peripheral region of the diaphragm 49 of the diaphragm unit 48 is fastened firmly and tightly between the two housing parts 56 and 57.

The preassembled unit 23 is disposed in a recess 63 of the basic body 30. Viewed from the basic body 30 in the direction of the supply container 12, the indentation 43 provided in the basic body 30 merges, at a radial shoulder dog, with the recess 63. The surface of the portion 59 of the preassembled unit 23 oriented toward the basic body 30 rests on the radial shoulder 63*a* of the basic body 30. At the transition between the indentation 43 and the radial shoulder 63*a*, between the second housing part 57 and the basic body 30, a sealing element 64 is provided, which allows sealing off between the basic body 30 and the preassembled unit 23. The sealing element 64 serves to prevent fuel from being able to escape unintentionally out of the pressure chamber 44 between the housing 54 and the basic body 30. As an alternative it may be provided that the portion 59 of the second housing part 57, for the sake of a nonleaking disposition of the preassembled unit 23, has a camlike encompassing protrusion (not shown), which engages the shoulder 63*a*. This camlike protrusion can engage an indentation provided in the radial shoulder 63*a*. It may also be provided that the shoulder 63*a* is shallow, or the indentation may be shallower than the encompassing protrusion. As a result of this, it can be attained that comparatively high pressure per unit of surface area and hence good sealing action and good, firm retention of the group 23 relative to the recess are assured. Even if the indentation in the basic body 30 is omitted, the protrusion provides metal sealing with high pressure per unit of surface area and thus a good sealing action. The sealing element 64 can then be dispensed with or may be provided as an additional seal.

The preassembled unit 23 is inserted into the recess 63 until the preassembled unit 23 comes to rest, with its portion 59, on the radial shoulder 63*a*. The recess 63 is surrounded by an annular encompassing bead protruding into the supply container 12. The bead is relatively narrow and can therefore easily be bent over using a simple die. The bead forms a deformable region 66 of the basic body 30. Before the preassembled unit 23 is fastened to the basic body 30, the bead has a cylindrical shape. For fastening the preassembled unit 23 to the basic body 30, the bead protruding beyond the portions 58, 59, 61 is bent radially inward. In the region of the portions 58, 59, 61 of the housing 54 and the deformable, encompassing region 66 of the basic body 30, this creates a fastener 80 that retains the preassembled unit 23 on the basic body 30. The portions 58, 59, 61 of the preassembled unit form a fastening portion 80*a*, provided on the housing 54 of the preassembled unit 23, which can be engaged by the deformable region 66 of the basic body 30. As a result, the fastener 80 engages the fastening portion 80*a* at a location between the basic body 30 and the preassembled unit 23.

Because the firm connection 70 formed from the portions 58, 59, 61 of the housing 54 represents a stable, loadable region of the housing 54, which region of the housing 54 is also utilized as a fastening portion 80*a* for the connection 80 between the preassembled unit 23 and the basic body 30. This has the advantage that no region of the housing 54 requires extra reinforcement for the engagement of the fastener 80 with the housing 54.

The second housing part 57 expediently has a cylindrically extending shoulder 67, as a result of which the preassembled unit 23 can be disposed in a defined position relative to the recess 63. It is assured as a result that the valve body 60 retained in the cup 51 is disposed positionally correctly relative to the stop 47 of the stub 45 and is capable of properly closing the flow course for the fuel out of the pressure chamber 44 into the return conduit 55. Once the group 23 has been inserted into the recess 63, the bead is crimped over. As a result, the preassembled unit 23 is disposed in the recess 63 of the basic body 30. Thus assured precise reception of the preassembled unit 23, which in turn provides accurate positioning of the diaphragm group 48 relative to the stub 45.

In the first housing part 56 of the housing 54, a relief opening 65 is provided. As a result, the space existing on the side of the diaphragm 49 remote from the pressure chamber 44 can communicate with the ambient air, so that the contrary force of the spring 53 can urge the valve body 60 against the stop 47 without hindrance. However, especially if the pressure regulator 24 is disposed in the immediate vicinity of the engine 10, it is also possible to connect the relief opening 65 via a line, not shown for the sake of simplicity but for instance an intake line leading to the engine 10, so that the contrary force acting on the diaphragm unit 48 can be varied by means of the pressure in the intake line.

The fastener 80 for fastening the preassembled unit 23 to the basic body 30 may be provided, as an alternative to crimping, by recaulking or caulking the bead of the deformable region 66. This embodiment of the preassembled unit 23 according to the invention also makes it possible to integrate the stub 45 with the basic body 30 of the closure part 22, thus making a simple design of the pressure regulation 24 possible, as well as an economical embodiment of the basic body 30 itself. In the exemplary embodiment shown in FIG. 2, the bead acting as a deformable region 66 surrounds the outer edge of the recess 63 without interruption. However, it is also possible for the bead to be interrupted at one or more points along its circumference, thus creating a plurality of tabs, protruding from the edge of the recess 63 on the basic body 30 into the supply container 12 past the fastening portion 80*a* of the housing 54, and these tabs can be bent radially inward after the preassembled unit 23 has been attached to the basic body 30. This provides another option for embodying the fastener 80.

Figure 3:
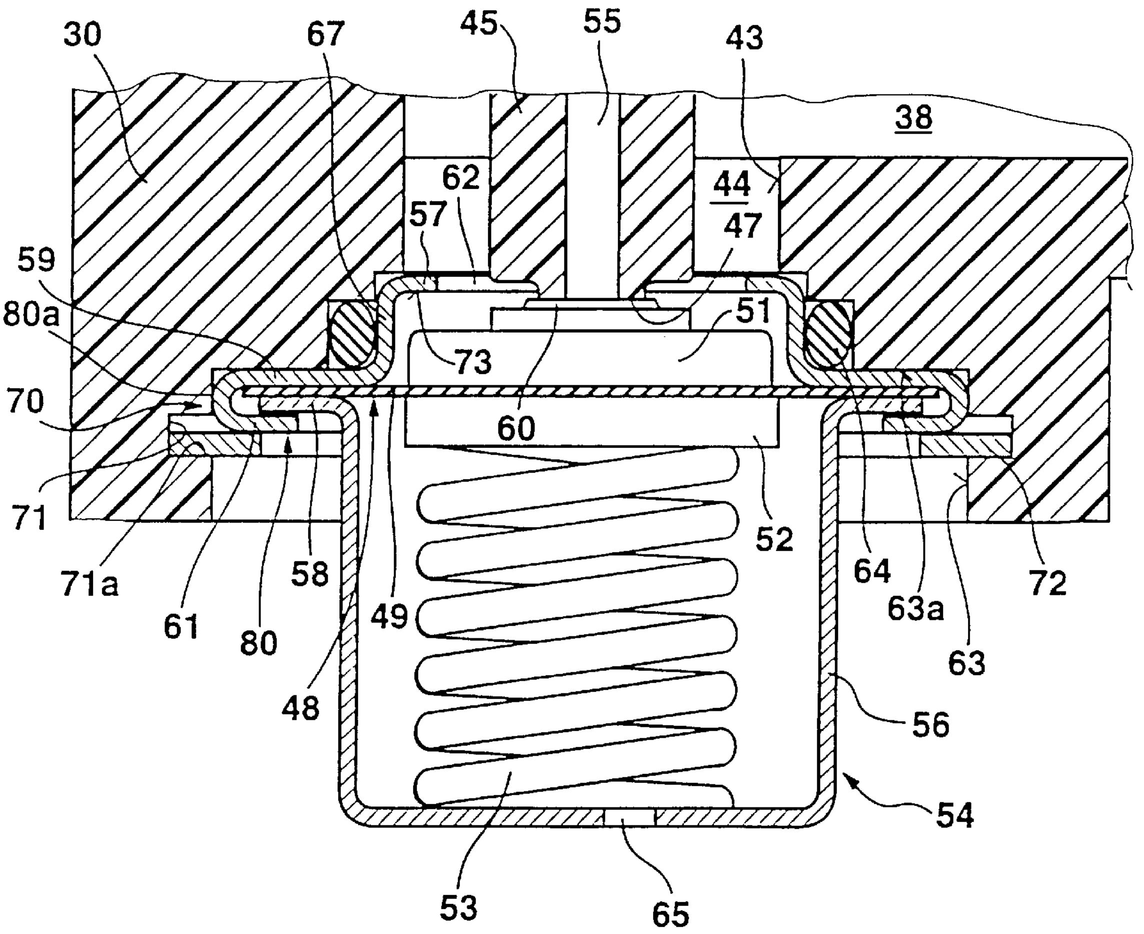
FIG. 3, a cross-sectional view of a second variant for fastening the preassembled unit on the basic body.

In FIG. 3, a variant of the fastener 80 for fastening the preassembled unit 23 to the basic body 30 of the closure part 22 is shown on a larger scale in comparison with FIG. 2. In all the drawing figures, identical parts or parts that function identically are provided with the same reference numerals. Unless otherwise noted or shown in the drawings, what is said and shown for one of the drawing figures applies to all the exemplary embodiments. Unless the description says otherwise, the details of the various exemplary embodiments can be combined with one another.

The basic body 30 has a groove 71, in which a ring 72 can be placed after the preassembled unit 23 can be positioned in the recess 63, This ring 72 may be embodied as a snap ring, which makes it possible for the preassembled unit 23 to be securely held in the recess 63. The ring 72 has a radially extending slit at one point along its circumference. The ring 72 is elastic; it yields outward in the radial direction and thereby holds securely with elastic initial tension in the groove 71. This embodiment has the advantage that simple replacement of the preassembled unit 23 and equalization of tolerances are made possible. Before it is installed in the groove 71, the ring 72 has an approximately frustoconical shape in cross section, similar to a cup spring. The ring 72 is placed in the groove 71 all the way around in such a way that first the inner surface of the ring 72 rests on the portion 61 of the fastening portion 80*a* of the housing 54 of the preassembled unit 23, and such that the outer surface of the ring 72 comes to rest on the flank 71*a* of the groove 71 remote from the portion 61. The spacing between the flank 71*a* of the basic body 30 and the radially extending shoulder 63*a* is adapted to the thickness of the ring 72 and the thickness of the fastening portion 80*a*, the latter including the portions 58, 59, 61, in such a way that the ring 72 deforms elastically in the retaining direction when installed in the groove 71. By the installation of the ring 72 in the region 71, the ring 72 is pressed partly or entirely flat, for instance with the aid of a stamping tool. After the ring 72 has been installed in the groove 71, this creates an initial tension in the ring 72, so that the fastener 80 firmly holds the preassembled unit 23 on the basic body 30 with elastic initial tension.

The exemplary embodiment may also be modified such that the ring 72 is slightly undulating, viewed in the circumferential direction; the form of undulation is adapted to the installation dimensions such that the undulations of the ring 72 after installation in the groove 71 are pressed somewhat flat in the retaining direction, and thus because of its elastic deformation the ring 72 presses the fastening portion **80*a* with initial tension against the radial shoulder 63*a* of the basic body 30. This again has the result that the fastener 80 assures easily produced, durable, secure positioning of the preassembled unit 23 relative to the basic body 30**.

It may furthermore be provided that after the preassembled unit 23 has been positioned in the recess 63, a cup-spring-shaped ring is provided, which positions the preassembled unit 23 with initial tension in the recess 63 as a result of ensuing caulking or recaulking or crimping of the deformable region 66 of the basic body 30.

As FIG. 3 shows the diameter of the opening 62, provided centrally in the second housing part 57, is smaller than the outer diameter of the cup 51, oriented toward the opening 62, of the diaphragm unit 48. This creates a stop 73 on the second housing part 57, against which stop the cup 51 of the diaphragm unit 48 can come to rest. Before the preassembled unit 23 is mounted on the basic body 30 and after any possible dismantling of the preassembled unit 23 from the basic body 30, the cup 51 rests on the stop 73. This offers the advantage that before the preassembled unit 23 is mounted on the basic body 30, the stop 73 restrains the cup 51, so that the spring 53 cannot overstretch the diaphragm 49. This makes the preassembled unit 23 easy to handle and easy to store, and the preassembled unit 23 is also well protected against damage before it is mounted on the basic body 30.

Once the preassembled unit 23 is mounted on the basic body 30, then adequate spacing exists between the stop 73 and the diaphragm unit 48, so that in the mounted state the diaphragm unit 48 cannot come to rest on the stop 73 but rather on the stop 47.

As an alternative to the disposition of the resilient ring 72, it may be provided that a ring with a thread is insertable and fixes the housing 54 in the recess 63. Because of the reception of the diaphragm 49 between the portions 58 and 59 of the first housing part 56 and the second housing part 57, positionally correct positioning of the diaphragm unit 48 is accomplished, because the threaded ring engages the portion 61 of the second housing part 57 and has no influence on the diaphragm group 48 during the fastening process.

Figure 4:
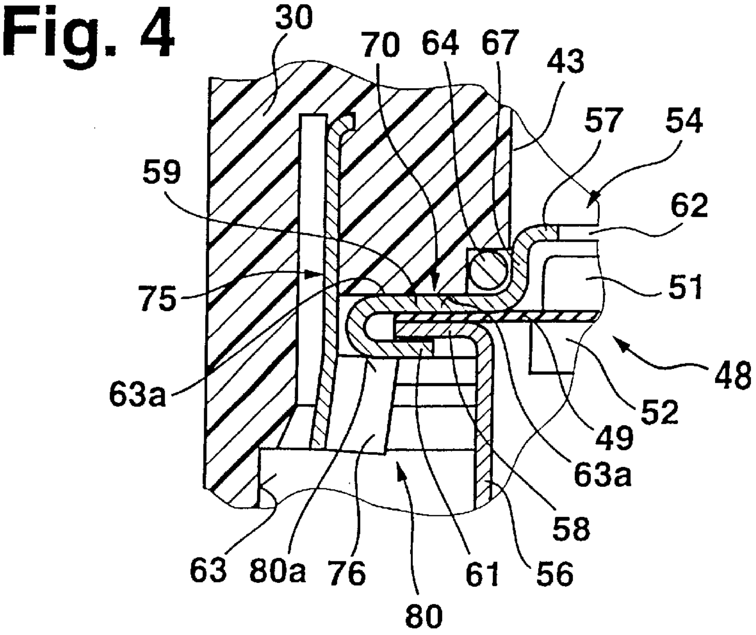
FIG. 4, a cross-sectional view of a further variant for fastening the preassembled unit on the basic body.

FIG. 4 shows a further alternative to FIG. 2 and FIG. 3, in cross section. The fastener 80 serving to fasten the preassembled unit 23 to the basic body 30 can be accomplished by means of a fastening ring 75 injected into the basic body 30. The fastening ring 75, on its inward-pointing end or in other words its end pointing away from the basic body 30, has tabs 76 distributed over its circumference, which are bent over after the positioning of the preassembled unit 23 in the recess 63, so that they engage the portion 61 of the second housing part 57 from behind and fix the preassembled unit 23 in the recess 63.

The fastening ring 75 for instance comprises resilient steel, and the length of the fastening ring 75 in the retaining direction is adapted to. the fastening portion **80*a* of the preassembled unit 23 in such a way that the fastening ring 75 deforms elastically when the tabs 76 are bent over, and as a result of this elastic deformation of the fastening ring 75, an elastic initial tension is created that tenses the housing 54 against the radial shoulder 63**.

Alternatively, it may be provided that the fastening ring 75, on its end pointing away from the basic body 30, has snap elements, which can be deflected during the mounting process of the preassembled unit 23 and which in the installed state, with its hook elements engage the portion 61 of the second housing part 57 from behind and in turn fix it in the recess 63. Other alternative embodiments of the fastener 80 that enable simple mounting of the preassembled unit 23 are also conceivable.

The exemplary embodiments described in conjunction with FIGS. 1–4 show the pressure regulator 24, which is disposed on the closure part 22. The pressure regulator 24 is built into the supply container 12 and embodied as a so-called nonreturn system. The nonreturn system is called this because in this system, excess fuel not needed by the engine 10 is returned directly into the supply container 12 through the pressure regulator 24 provided in the closure part 22, and as a result no return line that returns excess fuel from the engine 10 to the supply container 12 is needed.

Figures 5, 6:
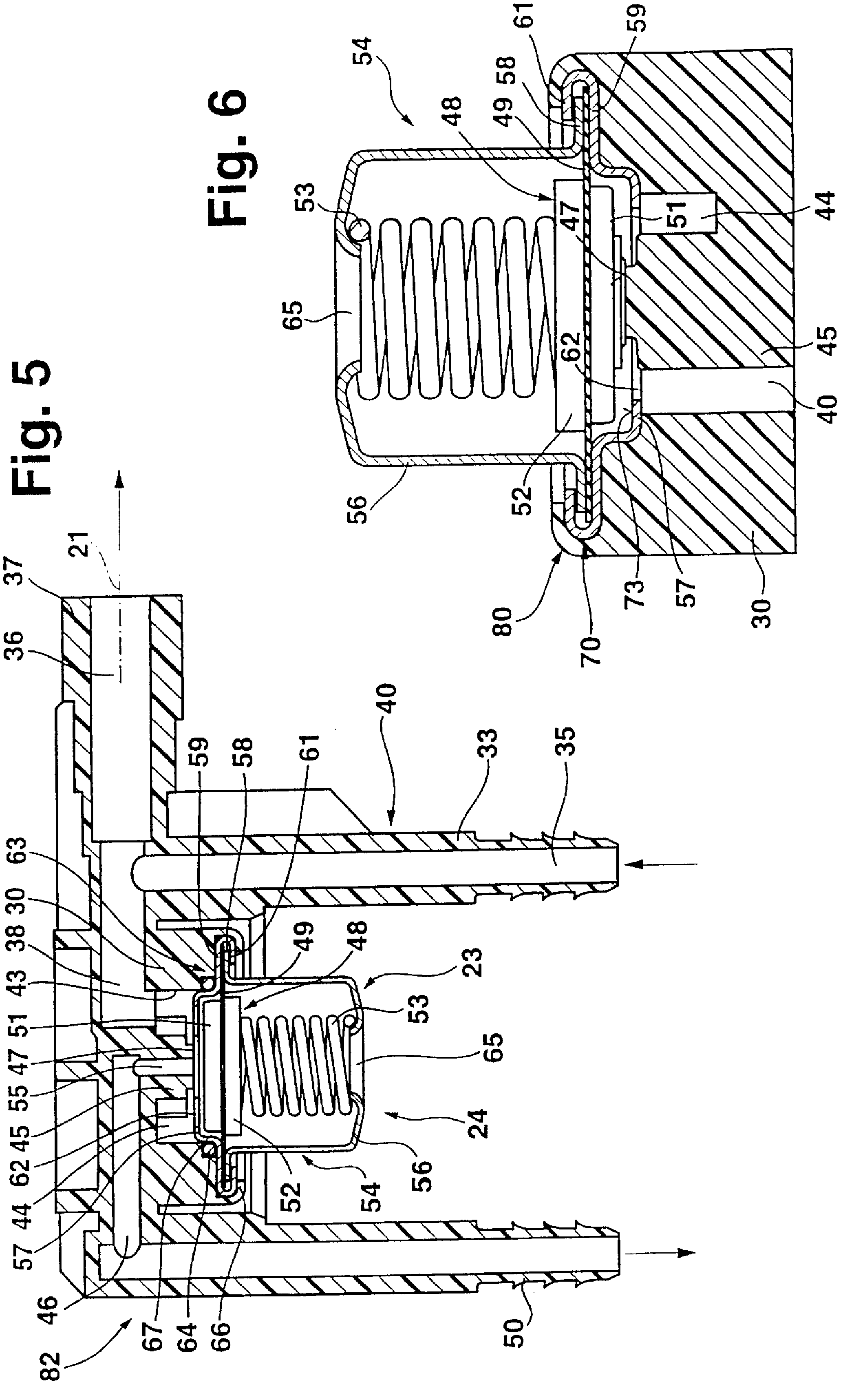
FIG. 5, an alternative embodiment of the device of the invention in the fuel distributor tube.
FIG. 6, an alternative embodiment of the device according to the invention for damping pressure pulsations of the fuel in the pressure chamber.

In FIG. 5, an alternative embodiment of the device according to the invention in a fuel distributor tube 82 is shown. In this exemplary embodiment, the basic body 30 is not a component of the closure part 22 as in the exemplary embodiment shown in FIG. 2; instead, the basic body 30 is a component of the fuel distributor tube 82. The basic body 30 essentially corresponds to the form described in conjunction with FIG. 2, but fastening means by which the basic body 30 is disposed on the supply container 12 are not provided. The options described in conjunction with FIGS. 2–4 may also be selectively contemplated for securing the preassembled unit 23 to the basic body 30. The fuel distributor tube 82 is normally disposed in the engine compartment, in the vicinity of the engine 10. The fuel flows from the feed pump 14 (FIG. 1) to the conduit 35 in the connection stub 33 (FIG. 5) via a supply line. Excess fuel not needed by the engine 10 flows out of the pressure chamber 44 between the stop 47 acting as a valve seat and the valve body 60 into the return conduit 55, and from there through the connection stub 50 and a return line, not shown, back into the supply container 12. The conduit 36 in the connection stub 37 formed onto the basic body 30 leads to an injection valve, not shown for the sake of simplicity. Via the injection valve, the fuel reaches the engine 10. Depending on the number of injection valves needed, other parallel conduits and connection stubs may be formed onto the basic body 30 of the fuel distributor tube 82 in addition to the conduit 36 in the connection stub 37, so that each of the injection valves is connected to the fuel distributor tube 82 via a separate connection stub.

However, it should be pointed out that the pressure regulator 24 may also be provided at any other point in the fuel supply system.

In FIG. 6, once again, a device for a fuel supply system having the diaphragm 49 is shown; the diaphragm is firmly fastened in its peripheral region between the first housing part 56 and the second housing part 57. In this embodiment as well, crimping of the two housing parts 56, 57 on their outer circumference creates a connection 70, by which the two housing parts 56, 57 are firmly joined to one another and the diaphragm 49 is installed firmly, tightly, reliably and durably in the housing 54. In this embodiment as well, the pressure chamber 44 communicates with the fuel connection 40. Via the fuel connection 40, fuel can be delivered to the pressure chamber 44 or removed from the pressure chamber 44. The device shown in FIG. 6 serves for instance to smooth pressure pulsations of the fuel in the pressure chamber 44 or the fuel connection 40. This device is therefore typically called a pressure damper. The device shown in FIG. 6 may, however, also be dimensioned such that the diaphragm 49 has a relatively long working stroke, so that in the event of a pressure rise the device can receive a corresponding quantity of fuel, which the pressure chamber 44 then gives up again if there is a pressure drop in the fuel, so that given suitable dimensioning this device is also known as a fuel reservoir.

If the device is intended to operate as a pressure damper or fuel reservoir, then the return conduit 55 shown in FIG. 3 is omitted.

The contrary force engendered by the spring 53 urges the diaphragm unit 48 against the stop 47. If there is no pressure in the pressure chamber 44, or if the pressure in the pressure chamber 44 is below a certain value, then the middle, movable region of the diaphragm unit 48 rests on the stop 47. If the pressure in the pressure chamber 44 exceeds a certain value, then the diaphragm unit 48 lifts away from the stop 47. In the exemplary embodiment shown in FIG. 6, in which the device has the function of a pressure damper, the stop 47 has the function of an end stop or repose stop, on which the diaphragm unit 48 can come to rest. As FIG. 6 shows, in this exemplary embodiment the valve body 60 provided in FIG. 3 has been dispensed with, so that the cup 51 firmly joined to the diaphragm 49 in FIG. 6 comes to rest on the stop 47 acting as an end stop.

The fastener 80 for the preassembled unit 23 accordingly to the invention is equally possible on a metal basic body 30. Then for instance instead of the injected resilient fastening ring 75 shown in FIG. 4, a resilient ring clamped or braced in place is disposed relative to the basic body 30.

All the embodiments preferably selected for more detailed description and shown by way of example have in common the fact that by means of the preassembled unit 23, a secured reception and positioning of the diaphragm 49 or of the diaphragm unit 48 is accomplished, so that regardless of the remaining design of the device, and in particular regardless of whether the device functions as a pressure regulator, pressure damper, or reservoir, the preassembled unit 23 is positioned in the correct position relative to the basic body 30, and as a result the diaphragm 49 that partitions off the pressure chamber 44 is securely positioned and functional.

In the exemplary embodiments described in conjunction with the drawing, the diaphragm unit 48 is located substantially inside the preassembled unit 23. The stop 47, which acts as a valve seat or as an end stop depending on the use made of the device, is provided on the basic body 30. The stop 47 can be produced together with the basic body 30 by simple injection or casting or injection molding of the basic body 30 together with the basic body 30. To produce the stop 47 on the basic body 30, no additional effort or expense, or only insignificant additional effort or expense, is needed. However, because the preassembled unit 23 can be produced without the stop 47, the production of the preassembled unit 23 is quite simple. By simply fastening the preassembled unit 23 to the basic body 30 with the aid of the fastener 80, a functional device is created which, depending on the rest of its embodiment, can function for instance as a pressure regulator or as a pressure damper or as a reservoir.

In the case of the connection 70 that holds together the two housing parts 56, 57 and fastens the outer circumference of the diaphragm 49 in place, a time-tested crimped connection can be employed, which has already been mass-produced on a large scale and has proven itself excellently and is simple to manufacture. Because the preassembled unit 23 need not be provided with a stop that is complicated and expensive to make, the production of the preassembled unit 23 can be mastered very simply and reliably. The foregoing relates to a preferred exemplary embodiment of the invention, it being understood that other variants and embodiments thereof are possible within the spirit and scope of the invention, the latter being defined by the appended claims.

What is claimed is:

1. A device for a fuel system of an internal combustion engine, comprising a basic body (30) a stub (45) in said basic body, a pressure chamber (44) that surrounds said stub (45) provided in the basic body (30), a fuel connection (40) leading through the basic body (30) to the pressure chamber (44) and connecting with an outlet stub (50), a housing (54) retained on the basic body (30) with the aid of a fastener (80), a stop (47) provided on an end of said stub (45) in the basic body (30), a diaphragm unit (48) that partitions off the pressure chamber (44) and is urged toward the stop (47) by a contrary force (53), the housing (54) includes at least a first housing part (56), remote from the stop (47), and a second housing part (57) oriented toward the stop (47), the first and second housing parts (56, 57) being joined together by a connection (70), the diaphragm unit (48) is fastened between the two housing parts (56, 57) and retained circumferentially by the connection (70), the second housing part (57) has a recess that allows the diaphragm unit (48) to seat on the stop (47), and the first and second housing parts (56, 57) and the diaphragm unit (48) are components of a preassembled unit (23), which is connected to the basic body (30) with the aid of the fastener (80).

2. The device of claim 1, in which the connection (70) is a crimped connection.

3. The device of claim 2, in which the two housing parts (56, 57) and the diaphragm unit (48) are components of a preassembled unit (23), which can be connected to the basic body (30) with the aid of the fastener (80).

4. The device of claim 1, in which the fastener (80) holds the housing (54) to the basic body (30) with initial tension.

5. The device of claim 1, in which the fastener (80) engages a fastening portion **(80*a*) of the housing (54)**.

6. The device of claim 1, in which the fastener (80) is embodied as a ring (72) that is insertable into a groove (71) of the basic body (30).

7. The device of claim 6, in which the ring (72) is resilient in the retaining direction.

8. The device of claim 1, in which the fastener (80) includes a region (66) provided on the basic body (30), which region is deformed after the housing (54) is mounted on the basic body (30).

9. The device of claim 1, in which the fastener (80) includes a fastening ring (75) that is injected into the basic body (30) and engages the housing (54) from behind.

10. The device of claim 1, in which the stop (47) is embodied as a valve seat.

11. The device of claim 10, in which a return conduit (55) is provided, which is used to carry fuel away from the stop (47).

12. The device of claim 1, in which the stop (47) is embodied as an end stop.

13. The device of claim 1, in which the two housing parts (56, 57) are joined together in the region of their outer circumference by the connection (70).

14. The device of claim 1, in which the diaphragm unit (48) is retained by the connection (70) between the two housing parts (56, 57).

* * * * *